US009610576B2

(12) United States Patent
Bordunov (10) Patent No.: US 9,610,576 B2
(45) Date of Patent: Apr. 4, 2017

(54) HYDROLYTICALLY STABLE ION-EXCHANGE STATIONARY PHASES AND USES THEREOF

(71) Applicant: Agilent Technologies, Inc., Loveland, CO (US)

(72) Inventor: Andrei Bordunov, Campbell, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 554 days.

(21) Appl. No.: 13/628,315

(22) Filed: Sep. 27, 2012

(65) Prior Publication Data

US 2014/0083946 A1    Mar. 27, 2014

(51) Int. Cl.

| | | |
|---|---|---|
| *B01J 39/26* | (2006.01) | |
| *B01J 41/20* | (2006.01) | |
| *B01D 15/36* | (2006.01) | |
| *B01D 15/20* | (2006.01) | |

(52) U.S. Cl.
CPC ............ *B01J 39/26* (2013.01); *B01D 15/206* (2013.01); *B01J 41/20* (2013.01); *B01D 15/361* (2013.01)

(58) Field of Classification Search
None
See application file for complete search history.

(56) References Cited

U.S. PATENT DOCUMENTS

| | | |
|---|---|---|
| 4,477,492 A | 10/1984 | Bergna et al. |
| 6,486,286 B1 | 11/2002 | McGall et al. |
| 6,991,852 B2 | 1/2006 | Carr et al. |
| 7,074,491 B2 | 7/2006 | Liu et al. |
| 7,125,488 B2 | 10/2006 | Li |
| 7,250,214 B2 | 7/2007 | Walter et al. |
| 7,919,177 B2 | 4/2011 | Jiang et al. |
| 2011/0143966 A1 | 6/2011 | McGall et al. |

OTHER PUBLICATIONS

Particle Size Conversion Table. Sigma Aldrich. 2015. Accessed on Mar. 13, 2015 from <http://www.sigmaaldrich.com . . . >.*
Shchepinov, M.S. et al. Steric factors influencing hybridisation of nucleic acids to oligonucleotide arrays. Nucleic Acids Research. 1997.*
DE 10 2013 014 242.3, Search Report, Mar. 19, 2014.

* cited by examiner

*Primary Examiner* — Katherine Zalasky
*Assistant Examiner* — Kara Graber (57) ABSTRACT

The invention provides novel ion-exchange media and related methods for their preparation and use. Ion-exchange stationary phases according to the invention are suitable for chromatographic separation of a variety of biomolecules. Distinguishing characteristics of ion-exchange media according to this invention includes, for example, their ability to separate variants of monoclonal antibodies via cation-exchange liquid chromatography using porous substrates with particle sizes <5 μm. The ion-exchange stationary media include a hydrolytically stable layer, which inhibits surface degradation of the particles in 100% aqueous media. Another unique feature is low molecular weight building blocks used to functionalize the particles with ion-exchange groups.

17 Claims, 4 Drawing Sheets

HYDROLYTICALLY STABLE ION-EXCHANGE STATIONARY PHASES AND USES THEREOF

FIELD OF THE INVENTION

The invention generally relates to ion-exchange media. More particularly, the invention relates to hydrolytically stable ion-exchange compositions and methods for their preparation and uses, for example, as stationary phase in chromatography.

BACKGROUND OF THE INVENTION

Ion-exchange chromatography is a frequently used chromatography technique that separates ions and polar molecules based on their charge. It can be used for almost any type of charged molecule including large proteins, polypeptides, nucleic acids, polynucleotides, small nucleotides and amino acids. The surface of the stationary phase displays ionic functional groups, which interact with analyte ions of opposite charge through columbic (ionic) interactions. Ion-exchange chromatography is thus divided into cation-exchange chromatography and anion-exchange chromatography. In cation-exchange chromatography, positively charged cations are retained because the stationary phase displays a negatively charged functional group, whereas in anion-exchange chromatography, anions are retained by positively charged functional groups on the stationary phase.

Proteins are ampholytes in that they generally have both negative and positive charges. For example, aspartic acid and glutamic acid residues display negative charges while arginine, lysine and histidine residues exhibit positive charges. The net charge on a protein, however, is often dependent on the composition of charged residues as well as the pH of the environment the protein is in.

Nonporous polymeric and silica particles typically have low surface areas, which is the main factor requiring the use of surface polymerization techniques to produce ion-exchange stationary phases based on nonporous particles. For instance, surface polymerization can be used to modify column capacities through incorporation of multiple ion-exchange groups into long polymeric chains, which are attached to the surface of the nonporous particles.

Nonporous substrates have been used for separation of biomolecules and monoclonal antibodies, in particular, due to unrestricted access of biomolecules to ion-exchange sites located at the surface of nonporous particles. However, surface functionalization via surface grafting, such as by polymerization, can be affected by many factors, including temperature, concentration of oxygen, mass-transfer during polymerization process, which can contribute negative effects on reproducibility of products. Also, commercial nonporous materials are not available in all desired particle sizes, which limits their use to certain available column formats.

A further disadvantage is that high back-pressure can develop in ion-exchange columns packed with nonporous particles, which are typically coupled with long polymeric chains attached to the particle surface. High back-pressure can become pronounced in columns packed with such nonporous particles, especially if they are small in size.

There remains an unmet need for stationary phase materials and compositions and related ion-exchange chromatographic methods that provide improved separation characteristics and efficiency as well as allow broader applications.

SUMMARY OF THE INVENTION

The invention is based in part on the unexpected discovery of novel ion-exchange materials and media and related methods for their preparation and use. Ion-exchange stationary phases according to the invention are suitable for chromatographic separation of a variety of biomolecules. Distinguishing characteristics of ion-exchange media according to this invention includes, for example, their ability to separate variants of monoclonal antibodies via cation-exchange liquid chromatography.

A unique feature of the ion-exchange stationary media disclosed herein is the inclusion of a hydrolytically stable monolayer, which inhibits surface degradation in 100% aqueous media. Another unique feature is the low molecular weight building blocks used to functionalize the particles with ion-exchange groups. The latter approach is contrary to the conventional method of grafting high molecular weight ion-exchange polymers onto the surfaces of stationary phases. These features together provide a much improved and versatile stationary phase.

In one aspect, the invention generally relates to an ion-exchange medium that includes: a particulate substrate having an average particle size of about 0.5 μm to about 100 μm in diameter; a hydrolytically stable monolayer of a bi- or poly-functional organosilane covalently attached to a surface of the particulate substrate; and an ion-exchange layer of one or more ion-exchange organic compounds covalently bond to the hydrolytically stable monolayer of a bi- or poly-functional organosilane. The ion-exchange layer exhibits a plurality of ion-exchange sites. The bi- or poly-functional organosilane has the structural formula of (I) and a molecular weight less than about 20,000, (I)

wherein
each of $R_1$, $R_2$, $R_3$, $R_4$, $R_5$ and $R_6$ are independently H, a $C_1$-$C_6$ alkyl group, or a Si—O—Si bond formed between the organosilane and the surface of the particles and/or between molecules of the organosilane, each of $Q_1$ and $Q_2$ is independently selected from a linear or branched, acyclic or cyclic, saturated aliphatic moiety, optionally with one or more carbon atoms substituted by oxygen, nitrogen or sulfur, and and Z is an amino functionalized organic group comprising 1 or more nitrogen atoms.

In certain embodiments, the particulate substrate is porous. In certain embodiments, the particulate substrate comprises a non-porous core and a porous shell. In certain embodiments, the particulate substrate is non-porous.

In another aspect, the invention generally relates to a method for purifying a biological analyte by ion-exchange chromatography. The method includes: providing an ion-exchange chromatography column packed with an ion-exchange medium; contacting a sample solution from which the biological analyte is to be purified with the ion-exchange chromatography medium allowing ion exchange between the sample solution and the ion-exchange chromatography medium; and eluting the biological analyte from the ion-exchange chromatography medium to purify the biological molecule. The ion-exchange medium includes: a particulate substrate having an average particle size of about 0.5 μm to about 100 μm in diameter, a hydrolytically stable monolayer of a bi- or poly-functional organosilane covalently attached to a surface of the particulate substrate; and an ion-exchange layer of one or more ion-exchange organic compounds covalently bond to the hydrolytically stable monolayer of a bi- or poly-functional organosilane. The ion-exchange layer exhibits a plurality of ion-exchange sites. The bi- or poly-functional organosilane has the structural formula of (I) and a molecular weight less than about 20,000, (I)

wherein
each of $R_1$, $R_2$, $R_3$, $R_4$, $R_5$ and $R_6$ are independently H, a $C_1$-$C_6$ alkyl group, or a Si—O—Si bond formed between the organosilane and the surface of the particles and/or between molecules of the organosilane,
each of $Q_1$ and $Q_2$ is independently selected from a linear or branched, acyclic or cyclic, saturated aliphatic moiety, optionally with one or more carbon atoms substituted by oxygen, nitrogen or sulfur heteroatoms, and
Z is an amino functionalized organic group comprising 1 or more nitrogen atoms.

The biological analyte may be any suitable biological molecule or material, such as proteins, enzymes, antibodies, oligonucleotides or polynucleosides, DNAs, RNAs, or polysaccharides.

In yet another aspect, the invention generally relates to a cation-exchange chromatography stationary phase, which includes: a particulate substrate having an average particle size of about 0.5 μm to about 100 μm in diameter; a hydrolytically stable monolayer of a bi- or poly-functional organosilane covalently attached to a surface of the porous particulate substrate; and a cation-exchange layer of one or more bi- or poly-acids selected from carboxylic, sulfonic and phosphonic acids covalently bond to the hydrolytically stable monolayer. The bi- or poly-functional organosilane has the structural formula of (I) and a molecular weight less than about 20,000, wherein
each of $R_1$, $R_2$, $R_3$, $R_4$, $R_5$ and $R_6$ is independently H, a $C_1$-$C_3$ alkyl group, or a Si—O—Si bond formed between the organosilane and the surface of the particulate substrate and/or between molecules of the organosilane,
$R_7$ is H or $C_1$-$C_3$ alkyl group,
each of m, n and k is an integer from about 1 to about 3, l is an integer from about 3 to about 6, and
Y is —(C═O)—(CH$_2$)$_j$—(C═O)—OR$_{10}$ or —(C═O)—(CH$_2$)$_j$—U—(CH$_2$)$_j$—(C═O)—OR$_{10}$, wherein $R_{10}$ is H and U is —NH—, oxygen or sulfur heteroatom, and j is an integer from about 1 to about 6.

DEFINITIONS

Figure 1:
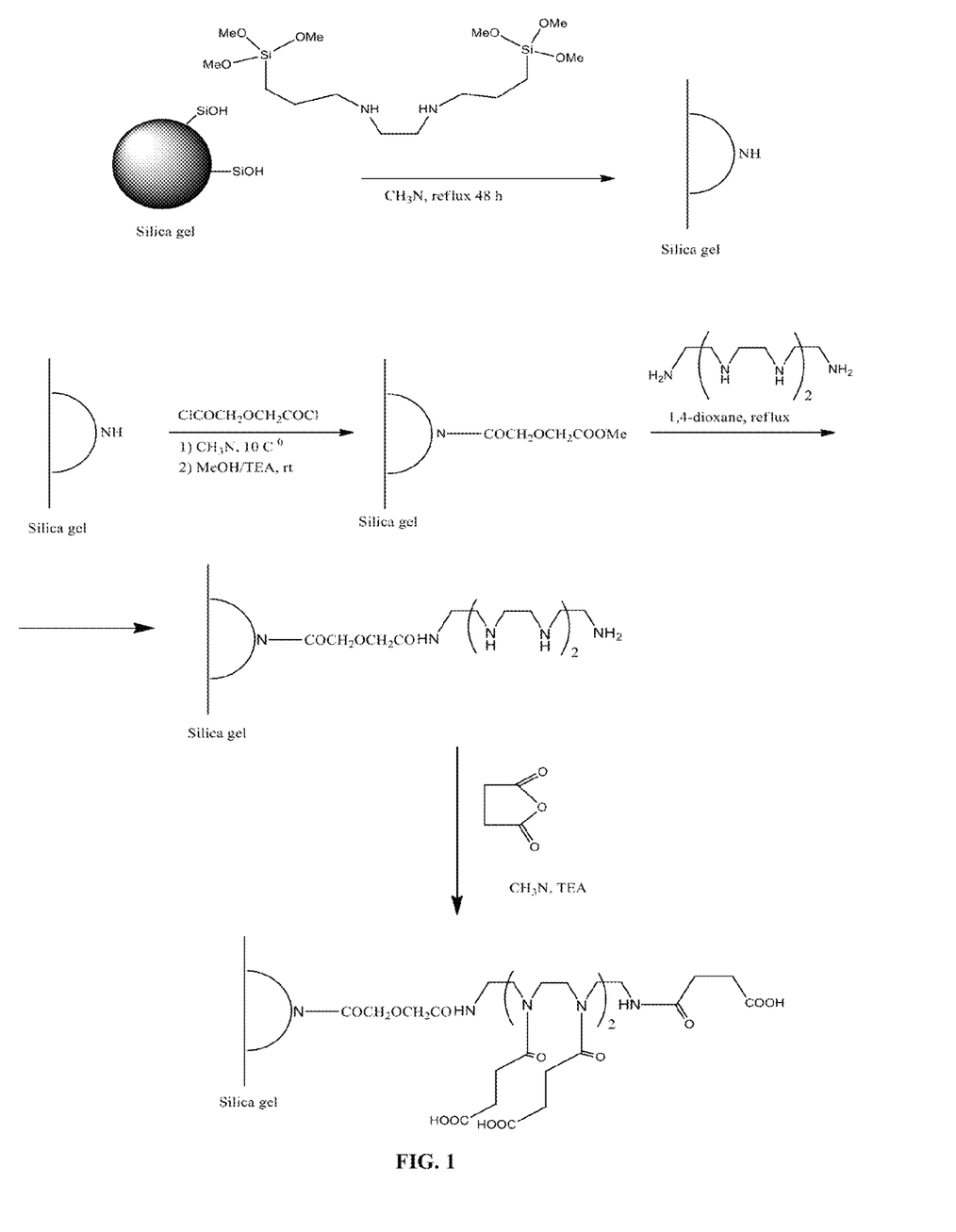
FIG. 1 shows an exemplary embodiment for preparing a compound of the invention.
Figure 2:
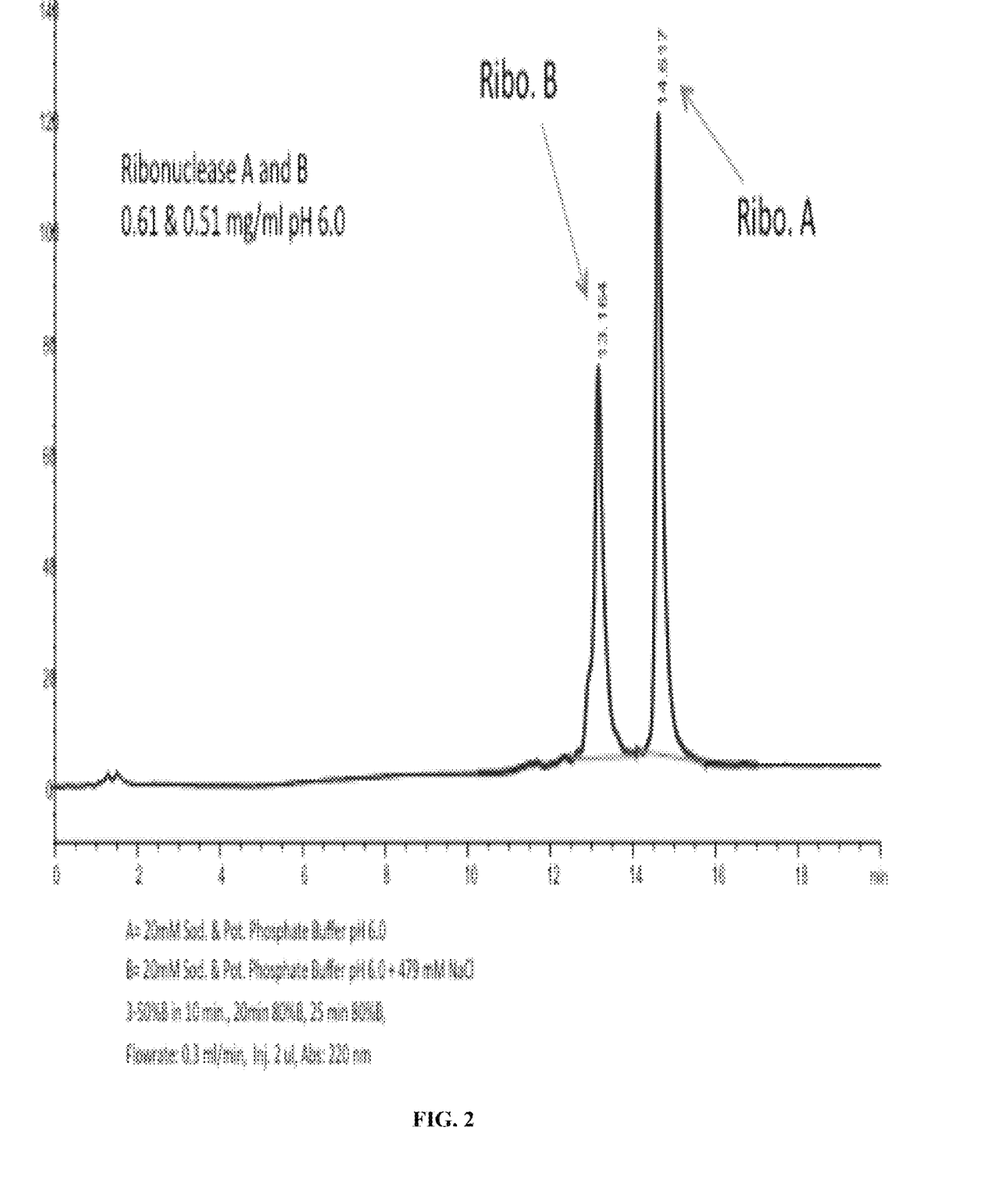
FIG. 2 shows an exemplary separation of Ribonuclease A and B using 2.1×150 mm weak cation-exchange column packed with the compound of the invention.
Figure 3:
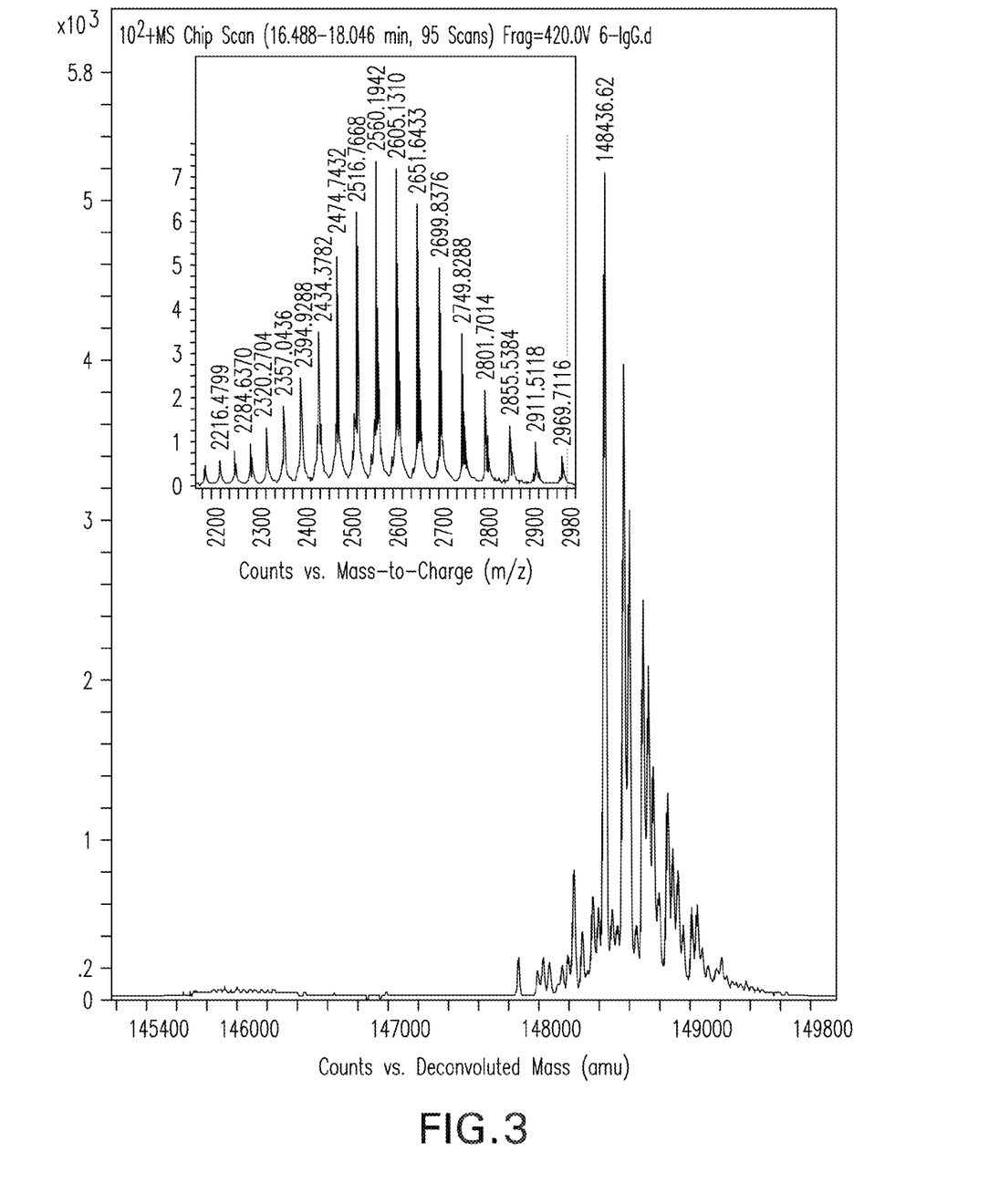
FIGS. 3 and 4 show an exemplary mass spec analysis of humanized IgG sample fractionated using 2.1×150 mm weak cation-exchange column packed with the compound of the invention. The attempt to fractionate this sample failed when the commercial non-porous weak cation-exchange stationary phase had been used.
Figure 4:
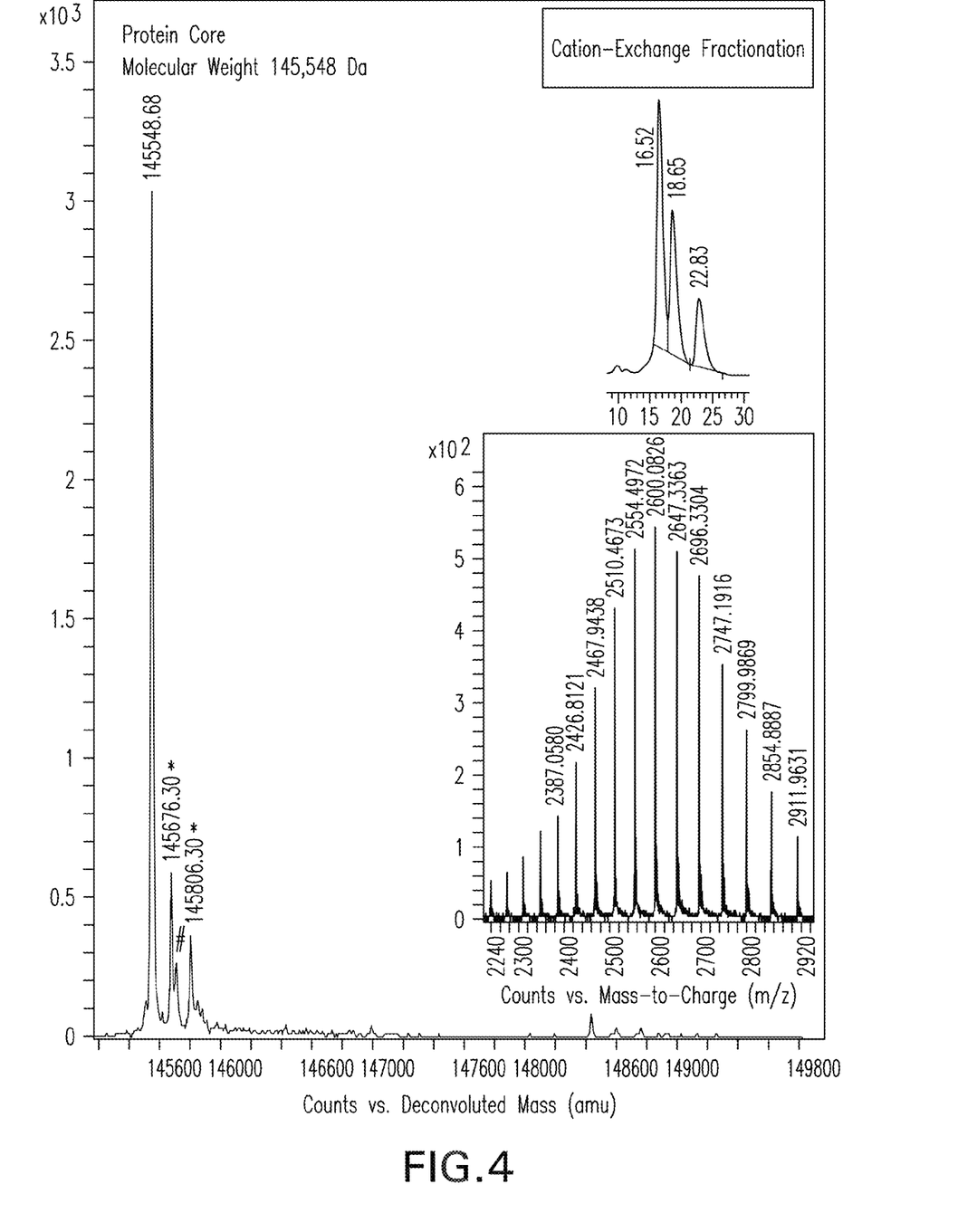

Definitions of chemical terms and functional groups are described in more detail below. General principles of organic chemistry, as well as specific functional moieties and reactivity, are described in "Organic Chemistry", Thomas Sorrell, University Science Books, Sausalito: 1999.

It will be appreciated that the compounds, as described herein, may be substituted with any number of substituents or functional moieties.

As used herein, "$C_x$-$C_y$," refers in general to groups that have from x to y (inclusive) carbon atoms. Therefore, for example, $C_1$-$C_6$ refers to groups that have 1, 2, 3, 4, 5, or 6 carbon atoms, which encompass $C_1$-$C_2$, $C_1$-$C_3$, $C_1$-$C_4$, $C_1$-$C_5$, $C_2$-$C_3$, $C_2$-$C_4$, $C_2$-$C_5$, $C_2$-$C_6$, and all like combinations. "$C_1$-$C_{20}$" and the likes similarly encompass the various combinations between 1 and 20 (inclusive) carbon atoms, such as $C_1$-$C_6$, $C_1$-$C_{12}$ and $C_3$-$C_{12}$.

As used herein, the term "aliphatic" refers to a non-aromatic, saturated or unsaturated, linear, branched, acyclic, cyclic, or polycyclic hydrocarbon backbone, which is optionally substituted with one or more functional groups. Examples include alkyl, alkenyl, alkynyl, cycloalkyl, cycloalkenyl, and cycloalkynyl moieties.

As used herein, the term "alkyl", refers to a hydrocarbyl group, which is a saturated hydrocarbon radical having the number of carbon atoms designated and includes straight, branched chain, cyclic and polycyclic groups. The term "hydrocarbyl" refers to any moiety comprising only hydrogen and carbon atoms. Hydrocarbyl groups include saturated (e.g., alkyl groups), unsaturated groups (e.g., alkenes and alkynes), aromatic groups (e.g., phenyl and naphthyl) and mixtures thereof.

As used herein, the term "$C_x$-$C_y$ alkyl" refers to a saturated linear or branched free radical consisting essentially of x to y carbon atoms, wherein x is an integer from 1 to about 10 and y is an integer from about 2 to about 20. Exemplary $C_x$-$C_y$ alkyl groups include "$C_1$-$C_{20}$ alkyl," which refers to a saturated linear or branched free radical consisting essentially of 1 to 20 carbon atoms and a corresponding number of hydrogen atoms. Exemplary $C_1$-$C_{20}$ alkyl groups include methyl, ethyl, n-propyl, isopropyl, n-butyl, isobutyl, dodecanyl, etc.

As used herein, the term, "$C_x$-$C_y$ alkoxy" refers to a straight or branched chain alkyl group consisting essentially of from x to y carbon atoms that is attached to the main structure via an oxygen atom, wherein x is an integer from 1 to about 10 and y is an integer from about 2 to about 20. For example, "$C_1$-$C_{20}$ alkoxy" refers to a straight or branched chain alkyl group having 1-20 carbon atoms that is attached to the main structure via an oxygen atom, thus having the general formula alkyl-O—, such as, for example, methoxy, ethoxy, propoxy, isopropoxy, n-butoxy, sec-butoxy, tert-butoxy, pentoxy, 2-pentyl, isopentoxy, neopentoxy, hexoxy, 2-hexoxy, 3-hexoxy, and 3-methylpentoxy.

As used herein, the term "halogen" refers to fluorine, chlorine, bromine, or iodine.

As used herein, the term "saturated," with respect to an aliphatic group refers to that all of the carbon-carbon bonds in the aliphatic group are carbon-carbon single bonds.

As used herein, the term "substituted" means that a hydrogen atom attached to a group, e.g., a hydrocarbyl group, has been replaced by another atom, e.g. Cl, or group of atoms, e.g. $CH_3$. For aryl and heteroaryl groups, the term "substituted" refers to any level of substitution, for example, mono-, di, tri-, tetra-, or penta-substitution. Substituents are independently selected, and substitution may be at any position that is chemically and sterically accessible.

As used herein, the term "organosilane" refers to an organic compound that is a derivative of a silane. The organic compound comprises at least one carbon to silicon bond.

As used herein, the term "stationary phase material" (or sometimes "stationary phase") refers to a loose particulate material intended for chromatographic use. Once the material is packed into a column and in contact with the mobile phase, it typically is referred to as the "stationary phase" and is the part of a chromatographic system responsible for the retention of the analytes, which are being carried through the system by the mobile phase.

DETAILED DESCRIPTION OF THE INVENTION

This invention provides novel ion-exchange media suitable for use in separation of various classes of biomolecules. Unique features of the ion-exchange stationary media disclosed herein include (1) the hydrolytically stable monolayer, which inhibits surface degradation in 100% aqueous media, and (2) relatively low molecular weight building blocks used to functionalize the particles with ion-exchange groups.

The invention provides a novel versatile stationary phase. Distinguishing characteristics of ion-exchange media disclosed herein include, for example, their ability to separate variants of monoclonal antibodies via cation-exchange liquid chromatography using porous substrates with particle sizes <5 μm.

The ion-exchange media are synthesized without surface polymerization. Low molecular weight, structurally defined, hydrolytically stable surface chemistry allows in some cases for dramatic improvements in column performance. For example, columns packed with cation-exchange porous silica particles of small diameters (e.g., 3 μm, 300 Å pore size) prepared according to this invention do not build high back pressures. This feature may allow to use them in ultrahigh pressure chromatography and fast analysis of biomolecules, such as monoclonal antibodies and bioactive proteins.

In one aspect, the invention generally relates to an ion-exchange medium that includes: a particulate substrate having an average particle size of about 0.5 μm to about 100 μm in diameter; a hydrolytically stable monolayer of a bi- or poly-functional organosilane covalently attached to a surface of the particulate substrate; and an ion-exchange layer of one or more ion-exchange organic compounds covalently bond to the hydrolytically stable monolayer of a bi- or poly-functional organosilane. The ion-exchange layer exhibits a plurality of ion-exchange sites. The bi- or poly-functional organosilane has the structural formula of (I) and a molecular weight less than about 20,000, wherein
each of $R_1$, $R_2$, $R_3$, $R_4$, $R_5$ and $R_6$ are independently H, a $C_1$-$C_6$ alkyl group, or a Si—O—Si bond formed between the organosilane and the surface of the particles and/or between molecules of the organosilane,
each of $Q_1$ and $Q_2$ is independently selected from a linear or branched, acyclic or cyclic, saturated aliphatic moiety, optionally with one or more carbon atoms substituted by oxygen, nitrogen or sulfur heteroatoms, and
Z is an amino functionalized organic group comprising 1 or more nitrogen atoms.

In certain embodiments, the particulate substrate is porous. In certain embodiments, the particulate substrate comprises a non-porous core and a porous shell. In certain embodiments, the particulate substrate is non-porous.

In regard to porous particulate substrate, the particles preferably have an average pore size of about 60 Å to about 2,000 Å (e.g., from about 60 Å to about 1,500 Å, from about 60 Å to about 1,000 Å, from about 60 Å to about 500 Å, from about 60 Å to about 400 Å, from about 60 Å to about 300 Å, from about 100 Å to about 2,000 Å, from about 100 Å to about 1,500 Å, from about 100 Å to about 1,000 Å, from about 100 Å to about 500 Å, from about 100 Å to about 400 Å, from about 100 Å to about 300 Å, from about 300 Å to about 2,000 Å, from about 300 Å to about 1,500 Å, from about 300 Å to about 1,000 Å, from about 300 Å to about 500 Å). The pore size distribution (one standard deviation) may be any suitable number, for example, not more than 40% (e.g., not more than 30%, not more than 20%, not more than 10%) of the pore size median.

In certain preferred embodiments, the particles have a surface area that is from about 5 $m^2/g$ to about 300 $m^2/g$ (e.g., from about 5 $m^2/g$ to about 200 $m^2/g$, from about 5 $m^2/g$ to about 100 $m^2/g$, from about 5 $m^2/g$ to about 50 $m^2/g$, from about 10 $m^2/g$ to about 300 $m^2/g$, from about 10 $m^2/g$ to about 200 $m^2/g$, from about 10 $m^2/g$ to about 100 $m^2/g$).

When the particles have non-porous cores, the core can have a volume ranging from about 10% to about 90% of the volume of the entire particles, more preferably from about 50% to about 80% (e.g., from about 50% to about 90%, from about 50% to about 80%, from about 50% to about 70%, from about 60% to about 90%, from about 60% to about 80%, from about 70% to about 90%) of the volume of the entire particles.

When the particles have non-porous cores, the core can have a weight ranging from about 10% to about 90% of the weight of the entire particles, more preferably from about 50% to about 80% (e.g., from about 50% to about 90%, from about 50% to about 80%, from about 50% to about 70%, from about 60% to about 90%, from about 60% to about 80%, from about 70% to about 90%) of the weight of the entire particles.

The particle size distribution (one standard deviation) may be narrow or broad, dependent on the desired utilities, and can be from about 40% or less of the median particle size, preferably of 30% or less of the median particle size, more preferably of 20% or less of the median particle size, and even more preferably of 10% or less of the median particle size.

In certain preferred embodiments, the bi- or poly-functional organosilane is covalently attached to the surface of the particulate substrate via two or more covalent bonds per molecule (e.g., via on average two covalent bonds per molecule, via on average more than two covalent bonds per molecule).

In certain embodiments, $Q_1$ is —$(CH_2)_m$—$CH_2$— or —$(CH_2)_m$G-$(CH_2)_n$—, $Q_2$ is —$(CH_2)_m$—$CH_2$— or —$(CH_2)_m$-G'-$(CH_2)_n$— each of m and n is an integer from about 1 to about 6 (e.g., 1, 2, 3, 4, 5, 6), G and G' are independently —NH—, oxygen, or sulfur heteroatoms, Z is wherein L is an aliphatic spacer group, optionally with one or more carbon atoms substituted by oxygen, nitrogen or sulfur heteroatoms, $R_7$ is H or a $C_1$-$C_6$ alkyl group, $R_8$ is a poly-amine group having 2 or more nitrogen atoms.

L, for example, may be —$(CH_2)_k$—, k is an integer from about 1 to about 6 (e.g., 1, 2, 3, 4, 5, 6), $R_7$ is H, and $R_8$ is wherein $R_9$ is a H or an alkyl group, l is an integer from about 1 to about 12, and Y is —(C=O)—$(CH_2)_j$—(C=O)—$OR_{10}$ or —(C=O)—$(CH_2)_j$—U—$(CH_2)_j$—(C=O)—$OR_{10}$, wherein $R_{10}$ is H and U is —NH—, oxygen or sulfur heteroatom, and j is an integer from about 1 to about 6 (e.g., 1, 2, 3, 4, 5, 6).

In certain preferred embodiments, the bi- or poly-functional organosilane has the structural formula of (II):

Each of $R_1$, $R_2$, $R_3$, $R_4$, $R_5$ and $R_6$ is independently H, a $C_1$-$C_3$ alkyl group, or a Si—O—Si bond formed between organosilane and the surface of the particulate substrate and/or between molecules of the organosilane. $R_7$ is H or $C_1$-$C_3$ alkyl group (e.g., 1, 2, 3). Each of m, n and k is an integer from about 1 to about 3 (e.g., 1, 2, 3). l is an integer from about 1 to about 12 (e.g., 1, 2, 3, 4, 5, 6, 7, 8, 9, 10, 11, 12). Y is —(C=O)—$(CH_2)_j$—(C=O)—$OR_{10}$ or —(C=O)—$(CH_2)_j$—U—$(CH_2)_j$—(C=O)—$OR_{10}$, wherein $R_{10}$ is H and U is —NH—, oxygen or sulfur heteroatom, and j is an integer from about 1 to about 6 (e.g., 1, 2, 3, 4, 5, 6).

The hydrolytically stable monolayer of a bi- or poly-functional organosilane is covalently attached to a surface of the particulate substrate. Here, the term "monolayer" refers to a layer having a single-molecule (as opposed to a polymeric molecule) in the dimension normal to the surface of the particulate substrate. The hydrolytically stable monolayer of a bi- or poly-functional organosilane may be a un-crosslinked or crosslinked network (extending on the surface of the particulate substrate) of a single molecular layer.

In cation-exchange applications, the ion-exchange layer of one or more ion-exchange organic compounds covalently bond to the hydrolytically stable monolayer has one or more cation-exchange organic compounds covalently bond to the hydrolytically stable monolayer. In anion-exchange applications, the ion-exchange layer of one or more ion-exchange organic compounds covalently bond to the hydrolytically stable monolayer has one or more anion-exchange organic compounds covalently bond to the hydrolytically stable monolayer.

Cation-exchange organic compounds may be any suitable compounds with cation-exchange groups, for example, bi- or poly-acids (free, activated or protected). Examples of bi- or poly-acids include carboxylic, sulfonic and phosphonic acids.

Anion-exchange organic compounds may be any suitable compounds with anion-exchange groups, for example, bi- or poly-bases (free, activated or protected). Examples of bi- or poly-bases include primary, secondary, ternary and quaternary amines.

The particulate substrate may be prepared from any suitable material. For example, the particulate substrate may be a silica-based solid material (e.g., prepared from silica gel). The particulate substrate may also be prepared from alumina (aluminum oxide), titania (titanium oxide), zirconia (zirconium dioxide) or hybrid organic/inorganic material.

The particulate substrate may have any particle size suitable for their designed applications, for example with an average size from about 1 μm to about 50 μm in diameter (e.g., from about 1 μm to about 20 μm in diameter, from about 1 μm to about 10 μm in diameter, from about 1 μm to about 5 μm in diameter, from about 3 μm to about 20 μm in diameter, from about 3 μm to about 15 μm in diameter, from about 3 μm to about 10 μm in diameter, from about 5 μm to about 20 μm in diameter, from about 5 μm to about 10 μm in diameter).

In certain embodiments, the molecular weight of organosilane is preferably less than about 10,000 (e.g., less than about 9,000, less than about 8,000, less than about 7,000, less than about 6,000, less than about 5,000, less than about 4,000, less than about 3,000, less than about 2,000).

In another aspect, the invention generally relates to a method for purifying a biological analyte by ion-exchange chromatography. The method includes: providing an ion-exchange chromatography column packed with an ion-exchange medium; contacting a sample solution from which the biological analyte is to be purified with the ion-exchange chromatography medium allowing ion exchange between the sample solution and the ion-exchange chromatography medium; and eluting the biological analyte from the ion-exchange chromatography medium to purify the biological molecule. The ion-exchange medium includes: a particulate substrate having an average particle size of about 0.5 μm to about 100 μm in diameter, a hydrolytically stable monolayer of a bi- or poly-functional organosilane covalently attached to a surface of the particulate substrate; and an ion-exchange layer of one or more ion-exchange organic compounds covalently bond to the hydrolytically stable monolayer of a bi- or poly-functional organosilane. The ion-exchange layer exhibits a plurality of ion-exchange sites. The bi- or poly-functional organosilane has the structural formula of (I) and having a molecular weight less than about 20,000, (I)

wherein
each of $R_1$, $R_2$, $R_3$, $R_4$, $R_5$ and $R_6$ are independently H, a $C_1$-$C_6$ alkyl group, or a Si—O—Si bond formed between the organosilane and the surface of the particles and/or between molecules of the organosilane, each of $Q_1$ and $Q_2$ is independently selected from a linear or branched, acyclic or cyclic, saturated aliphatic moiety, optionally with one or more carbon atoms substituted by oxygen, nitrogen or sulfur heteroatoms, and

Z is an amino functionalized organic group comprising 1 or more nitrogen atoms.

The biological analyte may be any suitable biological molecule or material, such as proteins, enzymes, antibodies, oligonucleotides or polynucleosides, DNAs, RNAs, or polysaccharides.

The ion-exchange chromatography medium may be designed as a cation-exchange chromatography medium or an anion-exchange chromatography medium by incorporating appropriate ion-exchange groups.

The ion-exchange method may be performed to achieve substantially purified biological analyte, for example, having a purity of at least 70%, at least 80%, at least 90%, at least 95, at least 99%.

In yet another aspect, the invention generally relates to a cation-exchange chromatography stationary phase, which includes: a particulate substrate having an average particle size of about 0.5 μm to about 100 μm in diameter; a hydrolytically stable monolayer of a bi- or poly-functional organosilane covalently attached to a surface of the porous particulate substrate; and a cation-exchange layer of one or more bi- or poly-acids selected from carboxylic, sulfonic and phosphonic acids covalently bond to the hydrolytically stable monolayer. The bi- or poly-functional organosilane has the structural formula of (I) and a molecular weight less than about 20,000, wherein
each of $R_1$, $R_2$, $R_3$, $R_4$, $R_5$ and $R_6$ is independently H, a $C_1$-$C_3$ alkyl group, or a Si—O—Si bond formed between the organosilane and the surface of the particulate substrate and/or between molecules of the organosilane, $R_7$ is H or $C_1$-$C_3$ alkyl group, each of m, n and k is an integer from about 1 to about 3, l is an integer from about 3 to about 6, and Y is —(C=O)—$(CH_2)_j$—(C=O)—$OR_{10}$ or —(C=O)—$(CH_2)_j$—U—$(CH_2)_j$—(C=O)—$OR_{10}$, wherein $R_{10}$ is H and U is —NH—, oxygen or sulfur heteroatom, and j is an integer from about 1 to about 6.

Methods for preparing the ion-exchange medium of the invention typically include two (or more) surface functionalization steps. The first step involves building a hydrolytically stable layer via formation of siliconoxygen-bonds between the surface of a particulate substrate (inorganic oxides such as silica) and polyfunctional silanes. Polyfunctional silanes can be mixed with various silanes during surface functionalization of inorganic oxides to introduce additional functionalities into the hydrolytically stable layer to modify its properties.

The second step involves reactions between free amino groups of the hydrolytically stable layer and bi- or poly-functional compound(s) having activated forms of carboxylic, sulfonic or phosphonic acids (e.g., anhydrides, esters, acyl halides, sulfonyl, or phosphoryl halides) to form covalent bonds via reactions between amino groups of the hydrolytically stable layer and activated forms of carboxylic, sulfonic or phosphonic acids of bi- or poly-functional compound(s). During the reactions, free amino groups of the hydrolytically stable layer can serve as attachment points for introduction of cation-exchange sites in either free, protected or activated form onto the surface of inorganic oxides.

When only portions of carboxylic, sulfonic or phosphonic acid groups of the bi- or poly-functional compound(s) is consumed during reaction with amine groups in the hydrolytically stable layer, the rest of the acid groups can be converted to cation-exchange sites as a result of hydrolysis or other chemical/physical process. The bi- or poly-functional compounds can include from 1 to about 20,000 cation-exchange groups per molecule in free, activated, or protected form. Each molecule of the bi- or poly-functional compounds may also have one or more reactive functional groups that are different from the rest of free, protected, or activated forms of cation-exchange groups.

For example, the bi- or poly-functional compounds may have a combination of alkyl halide/acyl chloride or isocyanate/ester functional groups. Exemplary molecules of bi- or poly-functional compounds include activated carboxylic acid groups (e.g., succinic anhydride, maleic anhydride; acyl chlorides, esters, NHS esters of dicarboxylic and polycarboxylic acids, and derivatives or combination thereof).

Cation-exchange groups can also be introduced onto the surface of inorganic oxides by reacting amino groups of the hydrolytically stable layer with bi- or poly-functional compounds carrying functional groups other than activated forms of carboxylic, sulfonic or phosphonic acids. The functional groups other than activated forms of carboxylic, sulfonic, or phosphonic acid can form covalent bonds with amines. Examples of such groups include epoxides, alkylhalides, and activated double bounds. Epoxides, alkylhalides, and activated double bonds of bi- or poly-functional compounds, which are not consumed during reaction with amino groups of the hydrolytically stable layer, can be further converted into cation-exchange groups directly or indirectly.

Examples of direct conversion include reactions of surface epoxides with esters of thiocarboxylic acids followed by hydrolysis of ester groups. Examples of indirect conversion include reactions of surface epoxides with polyethyleneimine followed by reaction between free amino groups of the hydrolytically stable layer and bi- or poly-functional compounds.

An optional step is covalent modification of residual activated carboxylic acid, sulfonic acid or phosphonic acid groups of the bi- or poly-functional compound(s), which are introduced onto the surface of inorganic oxides according to the above described reactions. Covalent modification is a result of interaction of residual activated carboxylic acid, sulfonic acid or phosphonic acid groups of bi- or poly-functional compound(s) with oligomers or polymers of molecular weight, for example, from about 200 to about 50,000, preferably from about 200 to about 2,000, and have amino groups in free or partially protected form.

These reactions may be designed to go repetitively, randomly or orderly to impact the end products, for example to increase in number of cation-exchange sites or anion-exchange sites introduced onto the surface.

The compositions and methods disclosed herein provide great flexibility in building controlled, hydrolytically stable surface architectures that carry multiple functionalities for chromatographic separation of highly hydrophilic analytes. The invention can be applied to various retention modes and a variety of separation techniques, including cation exchange, anion exchange, hydrogen bonding, metal chelation. Consequently, customized stationary phases for cation exchange, anion-exchange, hydrophilic interaction liquid chromatography (HILIC), and immobilized metal ion affinity chromatography (IMAC) can be designed based on the teachings herein using proper functional surface groups.

For instance, reacting amino groups of the hydrolytically stable layer with chloroacetamide (2-chloroacetamide) can create a HILIC stationary phase functionalized with primary amide groups. Reacting amino groups of the hydrolytically stable layer with a polyepoxy compound followed by its hydrolysis leads to a cross-linked hydroxylated surface. Metal chelating ligands can be introduced as well, for example, using interaction of surface polyepoxides with derivatives of iminodiacetic acid ($HN(CH_2CO_2H)_2$ or IDA).

As discussed above, the particulate substrate may be porous in the core and/or the shell, and may be non-porous in the core and/or in the shell.

A general method for preparing a particulate substrate with a porous shell with non-porous core is described in U.S. Pat. No. 4,477,492 by Bergna and in Kirkland, 2000 *J. Chromatography A* 965:25-34, each of which is expressly incorporated herein by reference in their entirety for all purposes. Additionally, U.S. Patent Pub. No. 2010-0051877 provides methods for preparing superficially porous particles having a solid core and an outer porous shell.

A general discussion of reactions of silanes with the surface of silica-based support materials is provided in "An Introduction to Modern Liquid Chromatography," L. R. Snyder and J. J. Kirkland, Chapter 7, John Wiley and Sons, NY, N.Y. (1979), which is expressly incorporated herein by reference in its entirety for all purposes. A discussion of reactions of individual silanes with porous silica can be found in "Porous Silica," K. K. Unger, p. 108, Elsevier Scientific Publishing Co., NY, N.Y. (1979), which is expressly incorporated herein by reference in its entirety for all purposes. A description of reactions of individual silanes with a variety of support materials is found in "Chemistry and Technology of Silicones," W. Noll, Academic Press, NY, N.Y. (1968), which is expressly incorporated herein by reference in its entirety for all purposes.

Generally, the composition according to the present invention may be employed in methods of separating a broad range of chemical species by chromatography. For use in chromatography, the compositions according to the invention, in a particulate form, may be packed into a chromatography column. Chromatography columns are produced in a variety of dimensions, which are based on the application that the particular column is used for. The chromatography column packed with a composition according to an embodiment of the invention may be operably connected to a reservoir containing a suitable carrier phase, and to a pump, for example, a mechanical or syringe pump, capable of pumping the carrier phase through the chromatography column, and to an injector capable of introducing one or more chemical species into the chromatography column. The chromatography column containing a composition according to the invention may further be operably connected to a detector, for example, an ultraviolet spectrophotometer, capable of detecting and optionally analyzing separated chemical species that are eluted from the chromatography column. The chromatography column containing a composition according to the invention may further be operably connected to a fraction collector capable of collecting the carrier phase containing separated species in a plurality of separate containers such that the separated species may be handled separately.

The composition according to the invention, in a particulate form, may alternately be deposited onto a chromatography plate, for example, a thin layer chromatography plate or preparative thin layer chromatography plate. A chromatography plate comprises a layer of a material, for example, glass or a polymer film, on which is deposited a chromatographic stationary phase composition. A chromatography plate containing a composition according to the invention may be operably connected to a reservoir of a suitable mobile phase and to an injector capable of introducing chemical species onto the chromatography plate.

The instrumentation and techniques for using compositions according to the invention for chromatographic separations, including high performance liquid chromatography (HPLC), thin layer chromatography (TLC), flash chromatography, solid phase extraction and other forms of chromatographic separation can be understood and employed by those skilled in the art.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

EXAMPLES

Hydrolytically stable silica particles (e.g., 3 μm, 300 Å pore size) have been prepared and used as cation-exchange stationary phases for separation of biomolecules, including monoclonal antibodies. Surface of the particles are functionalized with low molecular weight, structurally defined ligands allowing for high reproducibility of column manufacturing. The advantage of using "intermediate" pore size (~300-500 Å) silica particles is a combination of (a) surface area, (b) accessibility of surface ion-exchange groups, and (c) use of small particles (e.g., <5 μm) of porous substrates for packing ion-exchange columns.

Hydrolytically stable silica particles (e.g., 3 μm, 300 Å pore size) functionalized with cation-exchange groups can be operated in 100% aqueous media under conditions required for chromatographic separation of biomolecules. For example, packed in short (2.1×100 mm) columns the cation-exchange medium showed superior peak resolution of humanized IgG when compared to long (2.1×250 mm) columns packed with commercial weak cation-exchange nonporous polymeric particles.

Example 1

Synthesis of Weak Cation-Exchange Silica Gel (a) 15 g of 300 A, 3 μm silica particles were mixed with 50 mL of dry 1,4 dioxane and 10 g of N,N'-Bis[(3-trimethoxysilyl)propyl]ethylenediamine, 95% (Gelest). The reaction mixture was sonicated for 15 min. at 25° C. and then refluxed for 24 h under nitrogen in 250 mL round-bottom flask equipped with mechanical stirrer. Silica particles were filtered off using a glass filter, washed with hot 1,4-dioxane and methanol, and allowed to dry on the air.

(b) The resulting surface-functionalized silica particles from part (a) were placed in 250 mL round-bottom flask and mixed with 50 mL of dry acetonitrile. To this mixture 8 g of diglycolyl chloride was added in 10 mL of dry acetonitrile. The reaction mixture was sonicated for 15 min. and allowed to stay overnight at 25° C. The surface functionalized silica gel was filtered off using a glass filter and washed with anhydrous acetonitrile, keeping silica surface covered with small amount of dry acetonitrile all the time during that washing step. The resulting silica particles were transferred into 250 mL round bottom flask and combined with 50 mL of dry methanol and 5 mL of anhydrous triethylene amine. The reaction mixture was allowed to stay overnight at 25° C. The silica particles were filtered off and allowed to dry on the air.

(c) The resulting surface functionalized silica particles from part (b) were combined with 60 mL of dry acetonitrile and 10 g of pentaethylene hexamine. The reaction mixture was sonicated for 15 min. at 25° C. and then refluxed for 24 h under nitrogen in 250 mL round-bottom flask equipped with mechanical stirrer. Silica particles were filtered off using a glass filter, washed with hot acetonitrile and methanol, and allowed to dry on the air.

(d) The resulting surface-functionalized silica particles from part (c) were placed in 250 mL round-bottom flask and mixed with 50 mL of dry acetonitrile, 12 g of succinic anhydride and 8 mL of anhydrous triethylamine. The resulting suspension was sonicated for 15 min. and allowed to stay overnight at 25° C. Silica particles were filtered off using a glass filter, washed step-wise with hot acetonitrile, 5% aqueous triethylamine, water, 5% aqueous formic acid, water, and acetone. 14 g batch of produced cation-exchange silica was dried at 50° C. in the vacuum oven.

Example 2

Synthesis of Weak Cation-Exchange Silica Gel

Parts (a)-(c) from the Example 1 were repeated. The resulting surface-functionalized silica particles from part (c) were placed in 250 mL round-bottom flask and mixed with 50 mL of dry acetonitrile. 10 g of diglycolyl chloride and 5 mL of triethyleamine were added to this suspension at 5° C. The resulting suspension was sonicated for 15 min. and allowed to stay overnight at 25° C. Silica particles were filtered off using a glass filter, washed step-wise with hot acetonitrile, 5% aqueous triethylamine, water, 5% aqueous formic acid, water, and acetone. 14.5 g batch of produced cation-exchange silica was dried at 50° C. in the vacuum oven.

Example 3

Parts (a) and (b) from the Example 1 were Repeated

The resulting surface-functionalized silica particles from part (b) were placed in 250 mL round-bottom flask and mixed with 20 mL of dry DMF and 20 mL of dry acetonitrile. 5 g of PAMAM dendrimer (ethylenediamine core, 128 surface amino groups), 20 wt % methanol solution was added to the resulting suspension. The reaction mixture was sonicated for 15 min. at 25° C. and then refluxed for 24 h under nitrogen in 250 mL round-bottom flask equipped with mechanical stirrer. Silica particles were filtered off using a glass filter, washed with hot methanol, and allowed to dry on the air. The resulting surface-functionalized silica particles were placed in 250 mL round-bottom flask and mixed with 50 mL of dry acetonitrile, 12 g of succinic anhydride and 8 mL of anhydrous triethylamine. The resulting suspension was sonicated for 15 min. and allowed to stay overnight at 25° C. Silica particles were filtered off using a glass filter, washed step-wise with hot acetonitrile, 5% aqueous triethylamine, water, 5% aqueous formic acid, water, and acetone. 14.3 g batch of produced cation-exchange silica was dried at 50° C. in the vacuum oven.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. An ion-exchange medium, comprising:
   a particulate substrate having an average particle size of about 0.5 μm to about 100 μm in diameter;
   a hydrolytically stable monolayer of a bi- or poly-functional organosilane covalently attached to a surface of the particulate substrate and comprising a plurality of cation-exchange sites, the bi- or poly-functional organosilane having the structural formula of (I) and having a molecular weight less than about 20,000, (I)

wherein:
   each of $R_1$, $R_2$, $R_3$, $R_4$, $R_5$ and $R_6$ are independently H, a $C_1$-$C_6$ alkyl group, a Si atom of the surface of the particulate substrate, or a Si atom of another bi- or poly-functional organosilane,
   each of $Q_1$ and $Q_2$ is independently selected from a linear or branched, acyclic or cyclic, saturated aliphatic moiety, optionally with one or more carbon atoms substituted by oxygen, nitrogen or a sulfur heteroatom,
   L is an aliphatic spacer group, optionally with one or more carbon atoms substituted by oxygen, nitrogen or sulfur heteroatoms,
   $R_7$ is H or a $C_1$-$C_6$ alkyl group,
   $R_9$ is H or an alkyl group,
   l is 3, 4, 5, 6, 7, 8, 9, 10, 11 or 12, and
   Y is —(C=O)—(CH$_2$)$_j$—(C=O)—OR$_{10}$ or —(C=O)—(CH$_2$)$_j$—U—(CH$_2$)$_j$—(CH=O)—OR$_{10}$,
wherein $R_{10}$ is H, U is —NH—, oxygen or a sulfur heteroatom and j is an integer from about 1 to about 6.

2. The ion-exchange medium of claim 1, wherein the particulate substrate is porous.

3. The ion-exchange medium of claim 1, wherein the particulate substrate comprises a non-porous core and a porous shell.

4. The ion-exchange medium of claim 1, wherein the particulate substrate is non-porous.

5. The ion-exchange medium of claim 2, wherein the particulate substrate has an average pore size of about 60 Å to about 2,000 Å.

6. The ion-exchange medium of claim 1, wherein $Q_1$ is —(CH$_2$)$_m$—CH$_2$— or —(CH$_2$)$_m$-G-(CH$_2$)$_n$—, and $Q_2$ is —(CH$_2$)$_m$—CH$_2$— or —(CH$_2$)$_m$-G'-(CH$_2$)$_n$— each of m and n is an integer from about 1 to about 6, G and G' are independently —NH—, oxygen, or a sulfur heteroatom.

7. The ion-exchange medium of claim 6, wherein L is —(CH$_2$)$_k$—, k is an integer from about 1 to about 6, and $R_7$ is H.

8. The ion-exchange medium of claim 1, wherein the bi- or poly-functional organosilane has the structural formula of (II):

(II)

wherein
   each of $R_1$, $R_2$, $R_3$, $R_4$, $R_5$ and $R_6$ is independently H, a $C_1$-$C_3$ alkyl group, a Si atom of the surface of the particulate substrate, or a Si atom of another bi- or poly-functional organosilane,
   $R_7$ is H or $C_1$-$C_3$ alkyl group,
   $R_9$ is a H or an alkyl group,
   each of m, n and k is an integer from about 1 to about 3,
   l is 3, 4, 5, 6, 7, 8, 9, 10, 11, and
   Y is —(C=O)—(CH$_2$)$_j$—(C=O)—OR$_{10}$ or —(C=O)—(CH$_2$)$_j$—U—(CH$_2$)$_j$—(C=O)—OR$_{10}$,
   wherein $R_{10}$ is H, U is —NH—, oxygen, or a sulfur heteroatom and j is an integer from about 1 to about 6.

9. The ion-exchange medium of claim 1, wherein l is 3, 4, 5, or 6.

10. A method for purifying a biological analyte by ion-exchange chromatography, comprising:

providing an ion-exchange chromatography column packed with an ion-exchange chromatography medium comprising:

a particulate substrate having an average particle size of about 0.5 µm to about 100 µm in diameter, a hydrolytically stable monolayer of a bi- or poly-functional organosilane covalently attached to a surface of the particulate substrate and comprising a plurality of cation-exchange sites, the bi- or poly-functional organosilane having the structural formula of (I) and having a molecular weight less than about 20,000, (I)

wherein
each of $R_1$, $R_2$, $R_3$, $R_4$, $R_5$, and $R_6$ are independently H, a $C_1$-$C_6$ alkyl group, a Si atom of the surface of the particulate substrate, or a Si atom of another bi- or poly- functional organosilane, each of $Q_1$ and $Q_2$ is independently selected from a linear or branched, acyclic or cyclic, saturated aliphatic moiety, optionally with one or more carbon atoms substituted by oxygen, nitrogen or sulfur heteroatoms, L is an aliphatic spacer group, optionally with one or more carbon atoms substituted by oxygen, nitrogen or sulfur heteroatoms, $R_7$ is H or $C_1$-$C_6$ alkyl group, $R_9$ is H or an alkyl group, l is 3, 4, 5, 6, 7, 8, 9, 10, 11 or 12, and Y is —(C=O)—(CH$_2$)$_j$—(C=O)—OR$_{10}$ or —(C=O)—(CH$_2$)$_j$—U—(CH$_2$)$_j$—(C=O)—OR$_{10}$, wherein $R_{10}$ is H, U is —NH—, oxygen, or a sulfur heteroatom and j is an integer from about 1 to about 6.

contacting a sample solution from which the biological analyte is to be purified with the ion-exchange chromatography medium allowing ion exchange between the sample solution and the ion-exchange chromatography medium; and eluting the biological analyte from the ion-exchange chromatography medium to purify the biological molecule.

11. The method of claim 10, wherein the particulate substrate is porous, comprises a non-porous core and a porous shell, or is non-porous.

12. The method of claim 10, wherein the biological analyte is selected from proteins, oligonucleotides, polynucleotides, and polysaccharides.

13. The method of claim 10, wherein $Q_1$ is —(CH$_2$)$_m$—CH$_2$— or —(CH$_2$)$_m$-G-(CH$_2$)$_n$—, and $Q_2$ is —(CH$_2$)$_m$—CH$_2$— or —(CH$_2$)$_m$-G'-(CH$_2$)$_n$— each of m and n is an integer from about 1 to about 6, G and G' are independently —NH—, oxygen, or a sulfur heteroatom.

14. The method of claim 13, wherein L is —(CH$_2$)$_k$—, k is an integer from about 1 to about 6, and $R_7$ is H.

15. The method of claim 10, wherein the bi- or poly-functional organosilane has the structural formula of (II):

(II)

wherein
each of $R_1$, $R_2$, $R_3$, $R_4$, $R_5$ and $R_6$ is independently H, a $C_1$-$C_3$ alkyl group, a Si atom of the surface of the particulate substrate, or a Si atom of another bi- or poly-functional organosilane;

$R_7$ is H or $C_1$-$C_3$ alkyl group;

each of m, n and k is an integer from 1 to about 3;

l is an integer from 3 to 6; and

Y is —(C=O)—(CH$_2$)$_j$—(C=O)—OR$_{10}$ or —(C=O)—(CH$_2$)$_j$—U—(CH$_2$)$_j$—(C=O)—OR$_{10}$, wherein $R_{10}$ is H and U is —NH—, oxygen or a sulfur heteroatom and j is an integer from about 1 to about 6.

16. A cation-exchange chromatography stationary phase, comprising:

a particulate substrate having an average particle size of about 0.5 µm to about 100 µm in diameter;

a hydrolytically stable monolayer of a bi- or poly-functional organosilane covalently attached to a surface of the porous particulate substrate and comprising a plurality of cation-exchange sites, the bi- or poly-functional organosilane having the structural formula of (I) and having a molecular weight less than about 20,000, wherein
- each of $R_1$, $R_2$, $R_3$, $R_4$, $R_5$ and $R_6$ is independently H, a $C_1$-$C_3$ alkyl group, a Si atom of the surface of the particulate substrate, or a Si atom of another bi- or poly-functional organosilane,
- $R_7$ is H or $C_1$-$C_3$ alkyl group,
- $R_9$ is H or an alkyl group,
- each of m, n and k is an integer from 1 to about 3;
- l is an integer from 3 to 6; and
- Y is —(C=O)—(CH$_2$)$_j$—(C=O)—OR$_{10}$ or —(C=O)—(CH$_2$)$_j$—U—(CH$_2$)$_j$—(C=O)—OR$_{10}$, wherein $R_{10}$ is H, U is —NH—, oxygen, or a sulfur heteroatom and j is an integer from about 1 to about 6.

17. The cation-exchange chromatography stationary phase of claim 16, wherein the particulate substrate is porous, comprises a non-porous core and a porous shell, or is non-porous.

* * * * *

UNITED STATES PATENT AND TRADEMARK OFFICE
CERTIFICATE OF CORRECTION

| | |
|---|---|
| PATENT NO. | : 9,610,576 B2 |
| APPLICATION NO. | : 13/628315 |
| DATED | : April 4, 2017 |
| INVENTOR(S) | : Andrei Bordunov |

It is certified that error appears in the above-identified patent and that said Letters Patent is hereby corrected as shown below:

In the Specification

In Column 3, Line 37, delete "polynucleosides," and insert -- polynucleotides, --, therefor.

In Column 9, Line 58, delete "polynucleosides," and insert -- polynucleotides, --, therefor.

In Column 14, Line 17, delete "suspention" and insert -- suspension --, therefor.

In Column 14, Line 32, delete "suspention" and insert -- suspension --, therefor.

In Column 14, Line 56, delete "suspention" and insert -- suspension --, therefor.

In the Claims

In Column 16, Line 11, in Claim 1, delete "—(CH=O)" and insert -- —(C=O) --, therefor.

In Column 16, Line 62, in Claim 8, delete "11," and insert -- 11 or 12, --, therefor.

In Column 17, Line 56, in Claim 10, delete "6." and insert -- 6; --, therefor.

In Column 18, Line 8, in Claim 13, after "or" delete "a".

In Column 18, Line 8, in Claim 13, delete "heteroatom." and insert -- heteroatoms. --, therefor.

In Column 18, Line 35, in Claim 15, after "from" insert -- about --.

In Column 18, Line 39, in Claim 15, after "or" delete "a".

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,610,576 B2

In Column 19, Line 7, in Claim 16, after "is" insert -- a --.

In Column 19, Line 8, in Claim 16, after "from" insert -- about --.

In Column 19, Line 9, in Claim 16, delete "6;" and insert -- 6, --, therefor.